US008173253B2

(12) United States Patent
Green et al.

(10) Patent No.: US 8,173,253 B2
(45) Date of Patent: May 8, 2012

(54) LASER-IMAGEABLE MARKING COMPOSITIONS

(75) Inventors: William Green, Widnes (GB); Tristan Phillips, Widnes (GB); Anthony Jarvis, Widnes (GB); Christopher Anthony Wyres, Widnes (GB); Trevor Wilson, Widnes (GB)

(73) Assignee: Datalase Ltd., Widnes (GB)

( * ) Notice: Subject to any disclaimer, the term of this patent is extended or adjusted under 35 U.S.C. 154(b) by 773 days.

(21) Appl. No.: 12/095,414

(22) PCT Filed: Dec. 4, 2006

(86) PCT No.: PCT/GB2006/004508

§ 371 (c)(1), (2), (4) Date: Aug. 25, 2008

(87) PCT Pub. No.: WO2007/063332

PCT Pub. Date: Jun. 7, 2007

(65) Prior Publication Data

US 2008/0305328 A1 Dec. 11, 2008

(30) Foreign Application Priority Data

Dec. 2, 2005 (GB) .................................. 0524673.1

(51) Int. Cl.
*B32B 7/12* (2006.01)
*C08J 7/18* (2006.01)

(52) U.S. Cl. ......... 428/354; 428/343; 427/554; 427/555

(58) Field of Classification Search .................. 428/354, 428/343; 427/554, 555
See application file for complete search history.

(56) References Cited

U.S. PATENT DOCUMENTS

| | | | | |
|---|---|---|---|---|
| 5,063,137 | A | 11/1991 | Kiyonari et al. | |
| 5,827,590 | A * | 10/1998 | Morita et al. | 428/40.1 |
| 5,858,583 | A | 1/1999 | Dessauer et al. | |
| 6,180,318 | B1 * | 1/2001 | Fitzer et al. | 430/292 |
| 6,888,095 | B2 * | 5/2005 | Khan | 219/121.69 |
| 7,485,403 | B2 * | 2/2009 | Khan | 430/270.1 |
| 2003/0107062 | A1 * | 6/2003 | Yoon | 257/288 |
| 2005/0032957 | A1 | 2/2005 | Khan et al. | |
| 2005/0186511 | A1 | 8/2005 | Khan | |

FOREIGN PATENT DOCUMENTS

| | | | |
|---|---|---|---|
| EP | 0 593 270 | A | 4/1994 |
| EP | 0 792 756 | A | 9/1997 |
| EP | 1 384 753 | A | 1/2004 |
| WO | WO 98/12053 | A | 3/1998 |
| WO | WO 00/69648 | A | 11/2000 |
| WO | WO 00/78554 | A | 12/2000 |
| WO | WO 02/068205 | A | 9/2002 |
| WO | WO 02/074548 | A | 9/2002 |
| WO | WO 2004/043704 | A | 5/2004 |
| WO | WO 2005/012442 | A | 2/2005 |
| WO | WO 2006/018640 | A | 2/2006 |
| WO | WO 2006/129078 | A | 12/2006 |

* cited by examiner

*Primary Examiner* — Hai Vo
(74) *Attorney, Agent, or Firm* — Saliwanchik, Lloyd & Eisenschenk

(57) ABSTRACT

A tape construct comprises a laser-imageable composition, whereby images can be created in said tape by irradiation with a laser. In an alternative, a laser-imageable formulation suitable for spray application to a substrate, comprises a color-former, a binder and a carrier.

17 Claims, No Drawings

LASER-IMAGEABLE MARKING COMPOSITIONS

This application is a National Stage Application of International Application Number PCT/GB2006/004508, filed Dec. 4, 2006; which claims priority to Great Britain Application No. 0524673.1, filed Dec. 2, 2005.

FIELD OF THE INVENTION

This invention relates to laser-imageable marking compositions.

BACKGROUND OF THE INVENTION

WO02/068205, WO02/074548, WO2004/043704 and WO2005/012442, and also US2003/0186000, US2003/0186001, US2005/0032957 and US2006/0040217 (the content of each of which is incorporated herein by reference), describe laser imaging and also materials that can be used for that purpose. Examples that are provided typically involve the use of high energy lasers.

There are many attractions in using non-contact near-IR sources, in particular diode lasers, to generate images from coatings for applications such as variable information packaging. Favourable attributes of diode lasers such as economy, portability and ease of use, are attractive for current needs in the packaging industry, such as in-store labelling.

The use of ink formulations that incorporate materials which absorb radiation from far-IR to mid-IR sources such as heat (~1 to 20 μm) and $CO_2$ laser (~10 μm), allows the production of coatings that can generate a distinct coloured image on exposure to such wavelengths but not near-IR sources. The use of ink formulations that incorporate materials which absorb radiation from near-IR sources, such as diode lasers (~1 μm), allows the production of coatings that will generate a distinct coloured image on exposure to near, mid or far-IR irradiation.

SUMMARY OF THE INVENTION

The present invention provides secondary packaging labeling applications. In particular, there are two alternatives to current labeling systems, respectively using tape and spray. In the former, a tape is coated with a layer of a laser-markable ink composition and a layer of adhesive. The latter aspect is based on the discovery that a laser-imageable composition can be applied to a substrate in the form of a sudden swift stream or spray of ejected liquid, the spray being applied by a spray applicator system.

DESCRIPTION OF THE INVENTION

A tape of the invention can have continuous or discontinuous coatings. Suitable ink compositions are known; see the patent specifications identified above. Suitable adhesives will also be known to the skilled person.

In a specific example, for the purpose of illustration only, an ink is incorporated into a tape construction comprising, in order, a first, tape layer, a second layer of the ink, and a third, adhesive layer. The ink typically contains a laser-markable material such as AOM (ammonium octamolybdate).

The tape substrate may be any polymeric, e.g. polyester or polyolefin, or other suitable, known material. It is typically BOPP (biaxially oriented polypropylene), but may be any transparent material through which a printed image can be viewed.

Alternatively, in certain applications, it may be desirable to have an opaque substrate through which the image is not visible, but is visible via the reverse side once the tape is removed from the object to which it is applied, e.g. for security/promotional applications.

A wide variety of solvent-based or water-based ink formulations can be used. Particular preference is at present for nitrocellulose/polyurethane based ink or a PVB-based ink, as this affords good laser imaging performance, adhesion to the substrate and environmental stability. Ink compositions comprised of acrylic, methacrylic, styrenic, acetate, urethanes, imides, cellulosic, vinyl, binder systems, amongst others, can also be utilised.

The adhesive may also be solvent-based or water-based, although water-based formulations are generally utilised in this application. The adhesive may also be applied via a melt-process.

Sections of tape of various sizes can be applied to an object, e.g. packaging box, manually directly by hand, manually using an applicator/dispenser, or by automated applicator systems. An image can then subsequently be printed onto the tape/object using a laser at a given time/point. This process may be referred to as "apply and print." Alternatively, the image may be printed on the tape using a laser prior to application, commonly referred to as "print and apply" process.

Both methods afford benefits over conventional print/apply label technology, because the printing process is non-contact in nature. In particular, the use of lasers allows highly reproducible and consistent replication of images, a factor particularly pertinent where barcodes or other machine readable images are produced.

There are several commercially available automated systems for applying tape/patches of tape which can be adapted to apply the tape for apply/print, or adapted to incorporate a laser for print/apply techniques.

A fully automated system involving laser imaging and application of the tape/label, or vice versa, may be used. For print/apply, it may be an integrated system comprising the tape applicator and laser print engine. For apply/print, it may be a tape applicator and a separate laser at some point further downstream.

The simple construction of the tape is also advantageous, precluding the need for backing/release paper required in conventional label technology.

Furthermore, the construction also bestows enhanced environmental resistance, as the image/coating is shielded behind the substrate. Unlike many conventional label technologies, the image/coating is highly resistant to UV, water/moisture/steam, abrasion, solvents and other chemicals, e.g. corrosives.

Compositions imageable with UV, NIR or $CO_2$ lasers may be prepared. In all cases, images can be written through the substrate or adhesive layer without compromising integrity, i.e. without distortion or puncturing.

For the purposes of this specification, the term "tape" usually refers to a rolled-up strip of long, thin and narrow matter. The tape can be made of polymer, papers, textiles, metallic materials, or combinations thereof. Preferably, the tape is made of a polymer such as biaxially oriented polypropylene, other polyolefins such as polyethylene and copolymers, polyester such as PET, vinyl polymers such as PVC, or any other suitable polymer known to those skilled in the art.

Preferably, the tape is an adhesive tape, e.g. an adhesive-coated fastening tape used for temporary or, in some cases, permanent adhesion between objects. The tape can be single or doubled-sided. Preferably, the tape is single-sided, which allows joining of two overlapping or adjoining materials.

In the spray aspect of the invention, a suitable spray applicator system can be a manually operated spray system (e.g. spray/aerosol can, pressure system etc.), or an automated system. In either case, a laser imageable coating is applied to the surface of a given object.

An automated applicator system can utilise commercially available apparatus, whereby a coating can be applied to an object (e.g. corrugated packaging box) whilst it is traveling along a conveyor. An image can then be produced in this coated area using a laser. Suitable examples of spray application systems include those prepared by Spraying-Systems Co. (Wheaton, Ill., USA).

A suitable laser-imageable composition can also be applied to substrates using valve jet, ink jet, bubble jet or similar application systems.

Various water and solvent-based coating formulations may be used, which allow essentially colourless/transparent or opaque white coatings to be applied. $CO_2$, NIR and UV imageable compositions are suitable.

As much higher coat weights can be easily applied using a spray applicator system than with conventional printing techniques (gravure, flexo etc.), the level of laser imageable pigment in the composition can be significantly reduced, the net effect being a more environmentally resistant and resilient coating.

For example, $CO_2$ laser-imageable coatings/images prepared using a composition comprising 10 wt % ammonium octamolybdate (AOM) as colour-forming agent, in a water-based acrylic-PU binder, show outstanding environmental resistance. Thus, imaged samples survive repeated autoclave cycles (121° C., 95% relative humidity), immersion in a wide variety of chemicals/household reagents etc. without colouration of unimaged areas or reduction of optical density of imaged areas. This is particularly advantageous where imaged information must survive throughout a product life-cycle, e.g. barcodes applied to secondary packaging.

A laser-imageable spray composition for use in the present invention typically comprises colour-former, a binder and a carrier. Further additives may include NIR absorbers, dispersing agents, acid-generators, UV absorbers/stabilizers, processing aids, cosolvents, whitening agents, foam suppressants etc.

The contrast on non-white surfaces (e.g. corrugate) can be enhanced by addition of conventional whitening agents such as titanium dioxide or zinc oxide. Titanium dioxide is particularly preferred. Contrast is particularly important for applications requiring high quality barcodes.

The laser-imageable composition can be based on a inorganic or organic colour-former, that can be marked with a $CO_2$ laser, NIR laser, visible laser, or UV laser. An inorganic colour-former can be a oxyanion of a multivalent metal salt, preferred examples being molybdates, tungstates and vanadates. The salts can be Group 1 or 2 metal salts, ammonium salts or amine salts. Further examples of inorganic colour-formers suitable for use in the present invention can be found in WO02/074548. Preferred examples are octamolybdates, e.g. ammonium octamolybdate. Other examples include ammonium heptamolybdate, amine molybdates such as bis (2-ethylhexyl)amine molybdate. Further examples are tungstates including metatungstates such as ammonium metatungstate and vanadates including metavanadates, such as ammonium metavanadate.

Suitable organic colour-formers include materials known to those skilled in the art as leuco dyes. Suitable leuco dyes are described in "Dyestuffs and Chemicals for Carbonless Copy Paper" presented at Coating Conference (1983, San Francisco, Calif. pp 157-165) by Dyestuffs and Chemicals Division of Ciba-Geigy Corp Greenboro, N.C. Leuco dyes are understood to be colourless in neutral or alkaline media, but become coloured when they react with an acidic or electron-accepting substance. Suitable examples include compounds such as triphenylmethanephthalide compounds, azaphthalide compounds, isoindolide phthalide compounds, vinylphthalide compounds, spiropyran compounds, rhodamine lactam compounds, lactone and dilactone compounds, benzoyl leuco methylene blue (BLMB), derivatives of bis-(p-di-alkylaminoaryl)methane, xanthenes, indolyls, auramines, chromenoindol compounds, pyrollo-pyrrole compounds, fluorene compounds, and fluoran and bisfluoran compounds, with fluoran compounds being preferred. Particularly preferred commercial leuco dye products include the Pergascript range made by Ciba Speciality Chemicals, Basel, Switzerland and those by Yamada Chemical Co. Ltd, Kyoto, Japan. Alternative organic colour-formers that can be used in the present invention are carbazoles and diacetylenes disclosed in WO2006018640 and WO2006051309, the contents of which are incorporated by reference.

If an organic colour-former is present in the tape, it may also be desirable to additionally employ an acid-generating component. This can be either a photoacid generator or a thermal acid generator. Examples of photoacid-generators include the "onium"-types, such as sulphonium and iodonium compounds. Examples of thermal acid generators include trichloromethane heterocyclics. Reference may also be made to the other PCT application filed on 4 Dec. 2006 in the name of DataLase Ltd. et al, the content of which is incorporated herein by reference.

A laser-imageable composition of the present invention can also comprise a colour-forming system such as metal salt hydroxyl compounds; examples include sodium alginates, sodium metaborates, sodium silicates, metal salts in combination with hydroxyl compounds, of which examples include sodium carbonate with carbohydrates such as glucose and sucrose, polysaccharides such as cellulosics, gums and starches etc. Further examples of laser-imagable metal salts include sodium malonates, gluconates and heptonates. Further examples are given in PCT/GB2006/003945, PCT/GB2006/001969 and U.S. Pat. No. 6,888,095, the contents of which are incorporated herein by reference.

Any suitable source of energy may be used for marking, e.g. a laser. Suitable lasers include a $CO_2$ laser which typically emits light in the wavelength region 9-11.5 μm. A visible band laser typically emits light in the wavelength region 400-780 nm. When using such lasers, it is preferable to employ a composition comprising a material which absorbs in this region. A UV laser typically emits light in the wavelength region 190-400 nm. When using such lasers, it is preferable to employ a composition comprising a material which absorbs in this region.

Near-infrared radiation is in the wavelength range 780 to 2500 nm. A suitable near-infrared laser can be a solid-state, diode, fibre or a diode array system. Whenever a near-infrared laser is employed, it is desirable to add to the laser imageable composition a near-infrared-absorbing component. Preferred near-infrared-absorbing compounds are those that have an absorbance maximum similar to the wavelength of the near-infrared radiation employed and have little or no visible colour. Suitable examples include copper compounds such as copper (II) hydroxyl phosphate (CHP), non-stoichiometric mixed metal oxide compounds such as reduced indium tin oxide or reduced antimony tin oxide, organic polymers such as the conductive polymer product Baytron® P supplied by HC Starck, and near-infrared absorbing organic molecules, known to those skilled in the art as NIR dyes/pigments. NIR dyes/pigments than can be used include metallo-porphyrins, metallo-thiolenes and polythiolenes, metallo-phthalocyanines, aza-variants of these, annellated variants of these, pyrylium salts, squaryliums, croconiums, amminiums, diimoniums, cyanines and indolenine cyanines.

Examples of organic compounds that can be used in the present invention are taught in U.S. Pat. No. 6,911,262, and are given in Developments in the Chemistry and Technology of Organic dyes, J Griffiths (ed), Oxford: Blackwell Scientific, 1984, and Infrared Absorbing Dyes, M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765 and IR788; and the Pro-Jet™ series of dyes supplied by FujiFilm Imaging Colorants, Blackley, Manchester, UK, particularly Pro-Jet™ 830NP, 900NP, 825LDI and 830LDI.

The tape can be applied to a substrate unimaged, imaged or partly imaged. Where the tape is unimaged or partly imaged, it can be subsequently imaged with further information. The tape can be imaged with all required information and then applied to the substrate.

The binder can be any known to those skilled in the art. Suitable examples include acrylics, methacrylics, urethanes, cellulosics such as nitrocelluloses, vinyl polyers such as acetates and butyrals, styrenics, polyethers, polyesters. The binder system can be aqueous or organic solvent based. Examples of the binder systems that can be employed include the Texicryl range supplied by Scott-Bader, the Paranol range supplied by ParaChem, the Pioloform range supplied by Wacker-Chemie, the Elvacite range supplied by Lucite International Inc., The Joncryl range supplied by Johnson Polymers. The WitcoBond range supplied by Baxenden Chemicals.

The laser imageable composition can also be incorporated into the tape via melt-processing. This can be via direct addition of the components into the tape forming polymer composition, or via a masterbatch route.

The carrier for a spray can be any suitable fluid system. Examples include water and organic solvents such as ethanol, isopropanol, ethyl acetate and methyl ethyl ketone.

Substrates that the present invention can be applied to include corrugate, paper, card, plastics, glass, wood, textiles, metallics such as cans and foodstuffs, pharmaceutical preparations and containers or bottle closures. Foodstuffs include fruits and vegetables, confectionary and meat products. Pharmaceutical preparations include pills and tablets.

The following Examples illustrate the invention.

Example 1

A coating formulation comprising AOM (10-45 wt %), Nitrocellulose-DLX-3,5-ethanol (4.69 wt %), vilosyn 339 (2.69 wt %), casathane 920 (10.17 wt %), dibutyl sebacate (2.43 wt %), tyzor ZEC (3.91 wt %), Crayvallac WS-4700 (4.34 wt %) and ethanol B (24-59 wt %) was prepared. This was applied to 50 μm thick BOPP to give a dry applied coating weight of 10 gsm. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 2

Example 1 was repeated except that a melt-adhesive was used in place of a water-based adhesive. A fluence level of 2-4 $Jcm^{-2}$ is typically required to create a black image of OD>1.

Example 3

A coating formulation comprising AOM (10-45 wt %), Pioloform BN18 (5-25 wt %), aerosil 200 (0-5 wt %), ethyl acetate (5-50 wt %) and ethanol B (5-60 wt %) was prepared. This was applied to 50 μm thick BOPP to give a dry applied coating weight of 10 gsm. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 4

Example 3 was repeated except that a melt-adhesive was used in place of a water-based adhesive. A fluence level of 2-4 $Jcm^{-2}$ is typically required to create a black image of OD>1.

Example 5

A formulation comprising Pioloform BN18 15% in methyl ethyl ketone (84 g), Yamada ETAC (5 g) and benzyl hydroxybenzoate (15 g) was produced and applied to the substrate as described in Example 1. This tape construction can be imaged from either side using a $CO_2$ laser prior to application, or imaged through the substrate after application. A fluence level of 2-4 $Jcm^2$ is typically required to create a black image of OD>1.

Example 6

A formulation comprising Pioloform BN18 15% in methyl ethyl ketone (84 g), Yamada ETAC (5 g), benzyl hydroxybenzoate (BHB, 15 g) and copper (II) hydroxyl phosphate (20 g) was produced and applied to the substrate as described in Example 1. This tape construction can be imaged from either side using a 1066 nm NIR laser prior to application, or imaged through the substrate after application. A fluence level of 2-4 $Jcm^{-2}$ is typically required to create a black image of OD>1.

Example 7

A coating formulation comprising bis-(2-ethylhexyl) amine molybdate (10-45 wt %), Pioloform BN18 (5-25 wt %), aerosil 200 (0-5 wt %), ethyl acetate (5-50 wt %) and ethanol B (5-60 wt %) was prepared. This was applied to 50 μm thick BOPP to give a dry applied coating weight of 10 gsm. This coating was colourless/transparent. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 8

A coating formulation comprising AOM (5-10 wt %), Pioloform BN18 (5-25 wt %), aerosil 200 (0-5 wt %), ethyl acetate (5-50 wt %) and ethanol B (5-60 wt %) was prepared. This was applied to 50 μm thick BOPP to give a dry applied coating weight of 10 gsm. The coating is colourless/transparent. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 9

A coating formulation comprising ammonium heptamolybdate (10-45 wt %), Pioloform BN18 (5-25 wt %), aerosil 200 (0-5 wt %), ethyl acetate (5-50 wt %) and ethanol B (5-60 wt %) was prepared. This was applied to 50 μm thick BOPP to give a dry applied coating weight of 10 gsm. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 10

A coating formulation comprising ammonium heptamolybdate (10-45 wt %), Paranol T-6320 (10-50 wt %), water (5-50 wt %) and dispelair CF49 (0.1-5 wt %) was prepared. This was applied to 50 μm thick BOPP to give a dry applied coating weight of 10 gsm. The coating is colourless/transparent. Over this was applied a water-based adhesive at a dry applied coat weight of 20 gsm. The coating formulation and adhesive optionally contain 0-10 wt % of a whitener, e.g. titanium dioxide to enhance image contrast. This tape construction can be imaged from either side using a $CO_2$ laser prior to application, or imaged through the substrate after application. A fluence level of 2-4 $Jcm^{-2}$ is typically required to create a black image of OD>1.

Example 11

A NIR laser-imageable coating comprising AOM (10-30 wt %), CHP (10-30 wt %), Nitrocellulose-DLX-3,5-ethanol (4.69 wt %), vilosyn 339 (2.69 wt %), casathane 920 (10.17 wt %), dibutyl sebacate (2.43 wt %), tyzor ZEC (3.91 wt %), Crayvallac WS-4700 (4.34 wt %), and ethanol B (10-60 wt %) was prepared. This was applied to 50 μm thick BOPP to give a dry applied coating weight of 10 gsm. Over this was applied a water-based self-adhesive containing at a dry applied coat weight of 20 gsm. The adhesive optionally contain 0-10 wt % of a whitener, e.g. titanium dioxide to enhance image contrast. This tape construction can be imaged from either side using a NIR laser prior to application, or imaged through the substrate after application. A black image of OD>1 can easily be created using a laser with an emission wavelength of 800-2000 nm.

Ammonium heptamolybdate or bis-(2-ethylhexyl)amine molybdate may be used instead of AOM, in Example 11. In Examples 1-13, a UV laser can be used in place of a $CO_2$ or NIR laser to create images.

Example 12

A masterbatch comprising AOM (5-90 wt %) and EVA (10-90 wt %) was prepared by melt-extrusion. This material was then added to polypropylene at 1-99 wt % and the mixture melt-extruded into tape, which was then treated with adhesive to create a adhesive tape. This tape construction can be imaged from either side using a $CO_2$ or UV laser prior to application, or imaged through the substrate after application. A fluence level of 2-4 $Jcm^{-2}$ is typically required to create a black image of OD>1.

A NIR laser imageable composition was prepared in the same manner, by incorporating a NIR absorber.

Example 13

A coating formulation comprising 10,12-pentacosadiynoic acid (1-25 wt %), Elvacite 2028 (5-50 wt %) and methyl ethyl ketone (5-60 wt %) was prepared and coated onto BOPP. Over this was applied a water-based self-adhesive containing at a dry applied coat weight of 20 gsm. The adhesive optionally contains 0-10 wt % of a whitener, e.g. titanium dioxide to enhance image contrast. This tape construction can be imaged from either side using a UV laser prior to application, or imaged through the substrate after application. Multicolour images were created by controlling the laser fluence applied to a given area of the tape.

Example 14

A formulation comprising N-ethylcarbazole (1-50 wt %) in Nitrocellulose-DLX-3,5-ethanol (1-35 wt %), cyracure 6974 (1-30 wt %) and methyl ethyl ketone (5-70 wt %) was prepared and coated onto BOPP. Over this was applied a water-based self-adhesive at a dry applied coat weight of 20 gsm. The adhesive optionally contains 0-10 wt % of a whitener, e.g. titanium dioxide to enhance image contrast. This tape construction can be imaged from either side using a UV laser prior to application, or imaged through the substrate after application. Green coloured images were created by controlling the laser fluence applied to a given area of the tape.

Example 15

A formulation comprising sodium alginate (1-20 wt %), hydroxypropylmethylcellulose (1-20 wt %) and sodium bicarbonate (1-20 wt %) in ethanol (1-97) was prepared and coated onto BOPP. Over this was applied a water-based self-adhesive at a dry applied coat weight of 20 gsm. The adhesive optionally contains 0-10 wt % of a whitener, e.g. titanium dioxide to enhance image contrast. This tape construction was imaged from either side using a $CO_2$, or UV laser prior to application, or imaged through the substrate after application to generate contrasting images.

Example 16

A formulation comprising sodium metaborate (1-40 wt %), Paranol T-6320 (1-99 wt %) was prepared and coated onto BOPP. Over this was applied a water-based self-adhesive at a dry applied coat weight of 20 gsm. The adhesive optionally contains 0-10 wt % of a whitener, e.g. titanium dioxide to enhance image contrast. This tape construction was imaged from either side using a $CO_2$ or UV laser prior to application, or imaged through the substrate after application to generate contrasting images.

Example 17

A mixture of AOM (1-40 wt %), Paranol T-6320 (1-99%) and Dispelair CF-49 (0.1-5 wt %) was applied to a corrugate box using a automated spray system. Titanium dioxide (0.5-10 wt %) may be added. It was imaged using a $CO_2$ or UV laser to create a contrasting image.

Example 18

Example 17 was repeated, but also incorporating CHP (1 to 25%). Imaging with a NIR laser created a contrasting image.

Example 19

Examples 17 and 18 were repeated, but replacing AOM with ammonium heptamolybdate.

Example 20

A mixture of Pioloform BN18 15% in methyl ethyl ketone (84 g), Yamada ETAC (5 g) and benzyl hydroxybenzoate (15 g) was produced and applied to a substrate as described in Example 17. It was imaged using a $CO_2$ laser to create a contrasting image.

Example 21

Example 20 was repeated, but also adding CHP (1-25 wt %). Imaging using a NIR laser created contrasting images.

Example 22

A mixture of sodium metaborate (1-40 wt %), Paranol T-6320 (1-99%) and Octafoam E-235 (0.1 to 1%) was applied to a corrugated box using a automated spray applicator. It was imaged using a $CO_2$ or UV laser to create contrasting images.

Example 23

A mixture of sodium alginate (1-40 wt %), sodium bicarbonate (1-20 wt %), HPMC (1-20 wt %) and ethanol (1-99 wt %) was applied to a corrugated box using an automated spray applicator. It was imaged using a $CO_2$ or UV laser to create contrasting images.

By way of further illustration, the procedures of Examples 17 to 23 can be carried on other substrates, i.e. the inner surface of beverage bottle closures, PET film, PET beverage bottles, HDPE containers, metal cans, edible citrus fruits, pharmaceutical tablets and meat.

The invention claimed is:

1. A tape construct which comprises layers of, in order, a tape substrate, a laser-imageable ink and an adhesive, whereby images can be created in said tape by irradiation with a laser, wherein the laser-imageable ink is in direct contact with both the tape substrate and the adhesive, wherein the ink comprises a colour-former and a binder, wherein the binder is a material selected from the group consisting of: an acrylic; a methacrylic; a urethane; a cellulosic; a vinyl polymer; a styrenic; a polyether; and a polyester, and wherein the tape substrate consists of a polymeric material selected from the group consisting of: a polyester and a polyolefin.

2. The tape as claimed in claim 1, wherein the colour-former is inorganic.

3. The tape as claimed in claim 2, wherein the colour-former comprises an oxyanion of a multivalent metal.

4. The tape as claimed in claim 1, wherein the colour-former is organic.

5. The tape as claimed in claim 4, wherein the organic colour-former comprises a leuco dye, diacetylene or carbazoles.

6. The tape as claimed in claim 1, wherein the colour-former is a metal hydroxyl compound.

7. The tape as claimed in claim 1, wherein the colour-former is a metal salt in combination with a hydroxyl compound.

8. The tape as claimed in claim 7, wherein the hydroxyl compound is a carbohydrate or polysaccharide.

9. The tape as claimed in claim 1, which comprises a NIR-absorbing component.

10. The tape as claimed in claim 9, wherein the NIR-absorbing component is a copper(II) salt, reduced mixed metal oxide, conductive polymer or NIR dye/pigment.

11. The tape construct according to claim 1, wherein the tape construct consists essentially of the tape substrate, the laser-imageable ink, and the adhesive.

12. The tape construct according to claim 1, wherein the tape substrate is transparent to $CO_2$ laser light.

13. A method of producing a tape construct as claimed in claim 1, wherein said method comprises:

incorporating the laser-imageable ink into the tape substrate via melt-processing; and applying the adhesive to the tape substrate via melt-processing.

14. A method of coating an application substrate, which comprises applying to said application substrate a tape construct as claimed in claim 1.

15. The method according to claim 14, which further comprises imaging the coated application substrate with a laser in order to produce an application substrate carrying an image.

16. The method as claimed in claim 15, wherein the laser is selected from $CO_2$, UV, visible band and NIR lasers.

17. The method according to claim 14, wherein the application substrate is a material selected from the group consisting of corrugate, paper, card, plastics, glass, wood, textiles, metal, cans, foodstuffs, pharmaceutical preparations, pharmaceutical containers, and bottle closures.

* * * * *